United States Patent [19]

Snyder et al.

[11] 4,091,832
[45] May 30, 1978

[54] VALVE

[75] Inventors: David E. Snyder; Joe B. Locke; William C. Brabits, all of Longview, Tex.

[73] Assignee: U.S. Industries, Inc., New York, N.Y.

[21] Appl. No.: 671,571

[22] Filed: Mar. 29, 1976

[51] Int. Cl.² ............... F16K 11/07; F16K 31/122
[52] U.S. Cl. ................... 137/72; 137/625.66; 251/63.4; 251/63.5
[58] Field of Search ........... 137/72, 625.66, 458; 251/62, 63, 63.4, 63.5

[56] References Cited

U.S. PATENT DOCUMENTS

| | | | |
|---|---|---|---|
| 462,823 | 11/1891 | Phillipson | 251/63 |
| 948,344 | 2/1910 | Radick | 251/63 |
| 952,605 | 3/1910 | Connors et al. | 251/63 |
| 1,548,098 | 8/1925 | Raymond | 251/63 X |
| 3,043,331 | 7/1962 | Peters | 137/458 |
| 3,107,730 | 10/1963 | Lebourg | 251/63 X |
| 3,473,543 | 10/1969 | Haefner et al. | 251/63 X |
| 3,621,881 | 11/1971 | Vicari | 137/458 X |
| 3,746,047 | 7/1973 | Peters | 137/625.66 |
| 3,823,739 | 7/1974 | McMullan | 137/625.66 X |
| 3,863,672 | 2/1975 | Theriot et al. | 137/458 X |
| 3,996,965 | 12/1976 | Peters | 137/625.66 |

*Primary Examiner*—Alan Cohan
*Assistant Examiner*—Gerald A. Michalsky

[57] ABSTRACT

There is disclosed a valve having a spool sealably slidable longitudinally within a bore in its body between alternate positions for controlling flow of a first fluid between lateral ports connecting with the bore. The spool is urged toward a first position by a force due to a spring arranged within a chamber at one end of the bore, and to a second position by a force due to the pressure of a second fluid acting across a piston reciprocable within a chamber at the other end of the bore. A conical shoulder on a head of the spool engages a conical seat on the valve body at the intersection of the other end of the bore with the piston chamber so as to locate the spool in its second position and form a metal-to-metal seal with the seat.

9 Claims, 3 Drawing Figures

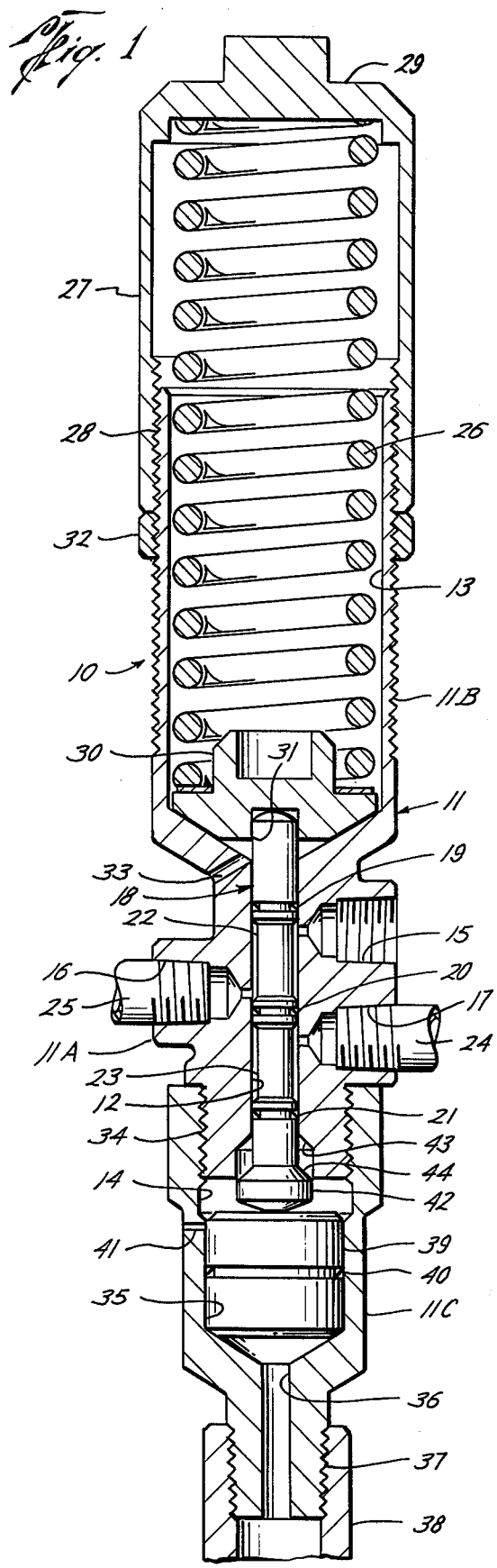

VALVE

This invention relates generally to valves; and, more particularly, to improvements in valves of the type which have a spool sealably slidable longitudinally within a bore in the body of the valve between alternate positions for controlling flow of a first fluid between lateral ports connecting with the bore, the spool being urged toward a first position by a force due to a spring acting on once end of the spool, and to a second position by a force due to the pressure of a second fluid acting on the other end of the spool, whereby the spool is caused to move between said positions in response to changes in the pressure of the second fluid.

U.S. Pat. No. 3,043,331 shows valves of this type which form part of a system for operating a motor valve used in opening and closing a flowline in response to changes in the pressure of the fluid within the flowline downstream of the motor valve. The motor valve is caused to move between opened and closed position by means of a first or control fluid which is alternately admitted to or exhausted from a diaphragm operator for the motor valve. The admission and exhaustion of the control fluid is controlled by two valves of the type contemplated by this invention which are installed between the source of control fluid and the motor valve operator, each such valve having one end of its spool connected with and thus responsive to the second or controlled flowline pressure. More particularly, one such valve is arranged to vent the control fluid in response to flowline pressure of a predetermined low level, so that as long as flowline pressure remains within these levels, both such valves admit control fluid to the operator for maintaining the motor valve open.

In the particular form shown in U.S. Pat. No. 3,043,331, the spool of each such valve carries three longitudinally spaced seal rings for controlling the flow of a first or control fluid between the intermediate of three longitudinally spaced ports and each of the outer ports by causing the longitudinally intermediate seal ring to slide across the intermediate port between positions on opposite sides thereof, the outer seal rings remaining in sealing engagement with the bore between one of the outer ports and the adjacent end of the bore in both positions of the spool. The intermediate port is connected with the motor valve operator, while one of the outer ports is connected to the source of the first or control fluid and the other of the outer ports constitutes a vent. The selection of which outer port is to be connected to the source of control fluid, and thus which one constitutes the vent, depends upon wheather the valve is to be responsive to high or low control pressure.

In another form of valve of this type, the intermediate lateral port is connected to the source of the first or control fluid, one of the outer lateral ports is connected to the motor valve operator, and the other outer lateral port is plugged. There is an enlarged chamber in the body at each opposite end of the spool bore, one chamber receiving the spring and the other containing a piston which reciprocates in response to the second or controlled fluid. The inner side of the piston engages the end of the spool so that the piston is moved to a first limited position as the spool moves to its first position, and moves the spool to its second position as the piston moves to a second limited position. The spool carries only two seal rings, one of which remains in sealing engagement with the bore on one side of the intermediate lateral port and the other of which slides across the unplugged outer lateral port between positions sealably engaged with the bore of the valve body on opposite sides thereof, a vent port is provided in each chamber adjacent its intersection with the spool bore. Thus, the spool is shiftable to alternately admit control fluid into the unplugged port connecting with the motor valve operator, or exhaust control fluid from the operator to the vent port in one of the chambers. When this form of valve is used to respond to a predetermined low controlled pressure, the spool moves in a direction toward the spring chamber and to its second position to exhaust control fluid through the vent in the spring chamber; and, when it is used to respond to a predetermined high pressure, the spool moves in an opposite direction and to its first position to exhaust through the vent in the piston chamber. The vent port in the piston chamber will, of course, prevent a pressure lock during reciprocation of the spool and piston.

In this latter form of a valve, the body includes a first portion in which the bore and lateral ports are formed, and a second tubular portion which provides the chamber in which the piston reciprocates. More particularly, the second body portion is threadedly connected to the first portion so that it may be replaced by another second portion having a different inner diameter for receiving a piston of different diameter and thus having different force characteristics.

In the valve shown in U.S. Pat. No. 3,043,331, the spool is located in its opposite positions by engagement of one of its ends with the end wall of the pressure chamber, and by engagement of an extension of its other end with a retainer for the spring on the end of the spring chamber. In the other form of valve, the spool is located in its alternate positions by engagement of a head on the end thereof within the pressure chamber with the end of the pressure chamber intersecting with the bore, and by engagement of the piston with the end of the piston chamber.

In each form of the valve, it may be desirable to change the spring because of damage or wear, or in order to substitute a spring having different force characteristics. This change is made by removing the retainer which is removably connected to one end of the spring chamber in order to compress the spring against one end of the spool. When the valve is in use, the spool is urged against the spring by a large force due to the high pressure of the controlled fluid effective over one end of the spool, and care must be taken to prevent this force from blowing the spring and spool from the outer end of the spring chamber, thus causing serious bodily harm to anyone in and around the valve, when the retainer is removed.

As will also be appreciated, inasmuch as the second or controlled fluid is normally at a much higher pressure than the first or control fluid, it is especially important that the controlled fluid not only be prevented from being vented, but also from being admitted to the operator for the motor valve which is not designed to withstand such high pressures. It is also desirable that these valves be so designed as to prevent this loss or admission of the high pressure controlled fluid even though the vent from the piston chamber is clogged and all of the O-rings or other conventional seal rings about the spool and piston are caused to fail due to fire or other adverse conditions.

Although the spring retainer of the first described form of valve permits the spring to be changed while, at the same time, preventing the spool from being blown out of the chamber, this requires that it be of complex construction. Also, although the head on the spool of the second described form will, in addition to locating the spool in one of its alternate positions, prevent the spool from being blown out of the spring chamber, the controlled fluid may be vented or admitted to the motor valve operator under certain conditions which may not necessarily cause all seal rings to fail. For example, the controlled fluid may be vented in the event the piston seal fails. Furthermore, in the event the vent from the piston becomes plugged, and the seal ring about the spool which is nearer the pressure chamber moves past the lateral port connecting with the motor valve, such controlled fluid may be admitted to the motor valve operator. Still further, since each of the above-described forms of valve prevents loss or commingling of the controlled fluid with the control fluid only by the interposition of one or more O-ring type seals, neither is capable of doing so in the event of fire or other adverse conditions which destroy all of the seal rings.

Another danger in the use of prior valves of this type is the possibility of disconnecting the first and second body portions while the pressure of the second or controlled fluid is still being applied to the piston, in which case the piston might be blown out of the second body portion to injure persons in and around the area. As will be appreciated, this may occur even though the conduits for the first or control fluid are no longer connected to the lateral ports in the body.

An object of this invention is to provide a valve of this type which prevents inadvertent release of the spool upon removal of the spring retainer and which may prevent loss or commingling of the high pressure fluid with the low pressure fluid even when the piston seal is lost and the pressure chamber vent is plugged, but which is nevertheless of simple and inexpensive construction.

Another object is to provide such a valve which prevents loss or commingling of the high pressure fluid with the low pressure fluid even though all seal rings are lost because of fire or other reasons.

A still further object is to provide such a valve which is capable of accomplishing both of the foregoing objects.

Yet a further object is to provide such a valve which will indicate to anyone who might otherwise attempt to disconnect the first body portion from the second body portion that the second fluid is still actively applied to the piston, whether the piston is in its first or its second position.

These and other objects are accomplished, in accordance with the illustrated embodiment of the present invention, by a valve which is similar to the first described form in that three lateral ports connect with the bore in its body at longitudinally spaced locations, and three seal rings are carried about its spool in longitudinally spaced relation, whereby the intermediate seal ring is slidable across the intermediate port to sealably engage the bore on opposite sides thereof, and each of the outer seal rings is sealably slidable within the bore between one of the outer ports and the adjacent end of the bore. Thus, as in the first described form, the spool functions to control the flow of the first fluid between the intermediate port and one of the outer ports in each of its alternate positions. As is also the case in this form of the valve, a pressure responsive member is longitudinally reciprocable within an enlarged pressure chamber at one end of the bore of the body, and the body has a port therein for admitting a second fluid to the pressure chamber on the outer side of the pressure responsive member to provide a force which urges it against the spool and thus urges the spool to a second position, the movement of the spool in response to such force being opposed by the force of a spring arranged within an enlarged chamber at the other end of the bore and compressed against the opposite end of the spool by means of a retainer releasably connected to the valve body to urge the spool to a first position.

However, as distinguished from the first described form of valve, the spool has a head thereon which is engageable with a seat on the body facing away from the spring chamber so as to limit movement of the spool beyond its second position, the seat preferably being located at the intersection of the pressure chamber with the adjacent end of the bore, whereby the bore and thus the spool are of constant diameter. Thus, this head performs two functions in that it not only prevents the spring and spool from being blown out through the spring chamber in the event the spring retainer is inadvertently removed while the valve is in use, but also prevents the outer seal ring about the spool which is nearest the pressure chamber from moving beyond the position in which it remains sealably engaged with the bore on the outer side of the outer lateral port in the valve body nearest the pressure chamber, thereby preventing commingling of the first fluid with the second fluid through a lateral port even though the seal about the piston may be lost and the vent in the pressure chamber on the inner side of the piston becomes clogged. More particularly, the first of these functions is accomplished without the necessity of a complex mechanism on the spring retainer, as was the case in the first described form of the valve.

In the preferred embodiment of the invention, the seal is conical, and the head on the spool has a conical shoulder about it which not only locates the spool in its second position,, but also forms a metal-to-metal seal with the seat. In this manner, commingling of the second fluid with the first fluid may be prevented even though all seal rings may be lost due to fire or other adverse conditions. At the same time, the maintenance of the outer seal ring about the spool during reciprocation of the spool will provide the added protection of preventing commingling under certain conditions, when the spool is not positioned to engage the seat, or even though the metal-to-metal seal, for any reason, might not maintain a good seal over an extended period of time.

In the illustrated embodiment of the invention, the load of a coil spring for urging the spool to its first position is transmitted to the spool by a plate engaging one end of the spool, the spool being arranged coaxially of and having an outer diameter less than the inner diameter of the coil spring, and the plate being of a material which fuses in the event of fire, and thus at a temperature of about 350° F. Thus, the spool is free to move upwardly to its second position to cause the conical shoulder on the head at its opposite end to form a metal-to-metal seat with the seat on the valve body even though the spool at the time the seal rings are lost by reason of fire or otherwise is in its first position, and the pressure of the second fluid is not sufficient to urge the spool to its second position against the force of the coil spring.

In accordance with still another novel aspect of the present invention, the second fluid is vented to indicate its presence in the piston chamber, both visually and audibly, in the event an attempt is made to disconnect the first body from the second body. Thus, a vent port is so located in the second body portion as to connect with the chanber on the inner side of the piston seal when the threads between the housing and first body portion are fully made up, whereby such second fluid is contained during normal operation of the valve whether the spool is in its first or second position, but to connect with the chamber on the outer side of the piston seal as the threads are partially disconnected, whether the piston is in its first or second position, whereby the second fluid is free to escape through the vent port.

In the drawings, wherein like reference characters are used throughout to designate like parts:

FIG. 1 is a vertical sectional view of a low pressure responsive valve constructed in accordance with the present invention, with the spool thereof moved to a position to vent control fluid in response to controlled fluid pressure below a predetermined level;

FIG. 2 is a partial vertical sectional view similar to FIG. 1, but with the spool moved to its alternate position to admit control fluid to a motor valve operator in response to controlled fluid pressure above the predetermined low level; and FIG. 3 is a partial vertical sectional view of a high pressure responsive valve constructed in accordance with the present invention, with the spool thereof moved to a position to admit control fluid to a motor valve operator in response to controlled fluid pressure below the predetermined high level.

With reference now to the details of the above-described drawings, and particularly FIGS. 1 and 2 thereof, the low pressure responsive valve, which is indicated in its entirety by reference character 10, comprises a valve body 11 having a bore 12 extending longitudinally thereof and enlarged chambers 13 and 14 at each end of the bore. Lateral ports 15, 16 and 17 in the valve body connect with the bore at longitudinally spaced locations, the port 16 connecting therewith longitudinally intermediate the outer ports 15 and 17.

A spool 18 is vertically reciprocable within bore 12 between a first lower position as shown in FIG. 1 and a second upper position as shown in FIG. 2, and seal rings 19, 20 and 21 are carried by the spool for sealably sliding within the bore during reciprocation of the spool between its alternate positions. More particularly, longitudinally intermediate seal ring 20 is slidable past longitudinally intermediate port 16 as the spool moves between its alternate positions, while the upper outer seal ring 19 remains in sealing engagement with the bore intermediate the intersection of upper outer port 15 therewith and the upper chamber 13, and the lower outer seal ring 21 remains in sealing engagement with the bore intermediate the intersection of lower outer port 17 therewith and lower chamber 14.

More particularly, spool 18 is recessed at 22 intermediate seal rings 19 and 20, and at 23 intermediate seal rings 20 and 21. Thus, in the lower position of the spool shown in FIG. 1, ports 15 and 16 are fluidly connected with one another, while port 17 is blocked off. On the other hand, in the upper position of the spool shown in FIG. 2, ports 16 and 17 are fluidly connected with one another while port 15 is blocked off. As will be described to follow, the spool is maintained in its upper position as long as the pressure of the controlled fluid is above a predetermined level. However, when the pressure of the controlled fluid drops below the predetermined level, the spool is moved downwardly to its FIG. 1 position.

A conduit 24 is connected to the outer end of port 17, and a conduit 25 is connected to the outer end of intermediate port 16, so that with the spool in the upper position of FIG. 2, a control fluid may pass from a suitable source through the conduit 24 into the conduit 25 leading to a motor valve operator (not shown) or other device to be actuated in response to the pressure of the controlled fluid. On the other hand, the outer end of upper port 15 is open so that with the spool in the lower position of FIG. 1, control fluid from the motor valve operator may be vented through a conduit 25 and out port 15, the supply of control fluid at this stage being blocked off by seal rings 20 and 21.

As shown in FIG. 1, the spool 18 is urged to its lower position by a coil spring 26 arranged within chamber 13 and compressed against the upper end of spool 18 by means of a retainer in the form of a cap 27 threadedly connected at 28 about the upper end of chamber 13. More particularly, the spring is compressed between the top wall 29 of the cap 27 and a plate 30 engaging the upper end of the spool which is received in a central socket 31 in the lower side of the plate. Preferably, the upper end of the spool is spherically shaped to permit some misalignment of the plate 30 and the spool.

The amount of force due to the spring may be adjusted by the longitudinal extent to which cap 27 is threadedly connected to chamber 13. When adjusted to the desired amount, the retainer may be locked against further make up with the threads of the chamber by means of a lock nut 32. As will be apparent from FIG. 1, the spring may be removed from chamber 13 merely upon backing off of the retainer cap 27. This, of course, permits changing of the spring in the event it is damaged, or in the event the spring having different force characteristics is desired. A vent port 33 is formed in the bottom wall of chamber 13 adjacent its intersection with the upper end of bore 12 in order to prevent the accumulation of pressure therein.

Body 11 of the valve includes a main portion 11A in which the bore 12 and lateral ports 15, 16 and 17 are formed, an upper tubular portion 11B which extends above the main body portion to define chamber 13, and a lower tubular portion 11C threadedly connected about the lower threaded end 34 of main body portion 11A so as to define chamber 14. A smooth-walled cylinder 35 is disposed within the chamber 14 coaxially of bore 18, and a port 36 connecting with the outer end of the chamber has a threaded outer end 37 for connection with a conduit 38, which in turn is connected with a flowline (not shown) containing the controlled fluid.

Piston 39 carrying a seal ring 40 thereabout is sealably slidable within cylinder 35 intermediate port 36 and the lower end of bore 12. Thus, control fluid acts over the outer side of piston 39 to provide an upward force which urges the piston into engagement with the lower end of the spool 18, and thus the spool toward the upper position of FIG. 2. Consequently, as previously described, the spool is moved between its alternate positions depending on the relative forces due to the coil spring and the pressure of the controlled fluid.

As previously described, as long as the upward force on the spool due to controlled fluid is greater than that due to the downward force of spring 26, the spool will remain in the upward position so as to admit control fluid to the motor valve operator. However, when the pressure of the controlled fluid drops below a predetermined value, the force it provides is less than that of the spring, so that the spool is moved downwardly to the lower position of FIG. 1, thereby permitting control fluid from the motor valve operator to be vented through port 15. Furthermore, the threaded connection 34 of body portion 11C to main body portion 11A permits it to be replaced by another body portion having a cylinder of different cross-sectional area to receive a piston of corresponding area, and thus to permit adjustment of the upward force due to controlled fluid, as will be understood from the description of FIG. 3 to follow.

With body portions 11A and 11B connected, as shown, a vent port 41 in both portion 11C connects with chamber 14 above seal ring 40, whether the piston is in its lower (FIG. 1) or upper (FIG. 2) position. Consequently, this port prevents a pressure lock above the piston as the latter reciprocates, and as long as the seal ring 40 is effective, contains the control fluid beneath piston 39. On the other hand, should the seal ring 40 fail, and as long as port 41 is not clogged, controlled fluid would leak past the piston and out through port 41 to provide an indication of its failure. Also, and as previously described, if an attempt is made to disconnect body portion 11A from piston 11C while pressure is within the chamber beneath the piston, the inner end of port 41 will pass beneath seal ring 40 before threads 34 are completely disconnected, so that controlled pressure will escape through the port to indicate its presence.

As will be understood from FIG. 1, the spool 18 located in its lower position by engagement of the lower end of piston 39 with the lower wall of valve body portion 11C. On the other hand, the spool is located in its upper position by engagement of a head 42 on the lower end of the spool with a seat 43 on valve body portion 11A at the intersection of the lower end of the bore with the upper end of chamber 14. As previously described, the head thus prevents the spool from moving upwardly beyond the position of FIG. 2 even though the spring retainer cap 27 may be removed while the valve is in service. Consequently, there is no danger of the spool being blown out through the spring chamber 13 even if the seal ring 40 fails and vent 41 is clogged, so that controlled fluid from conduit 38 would be effective over the cross section of seal ring 21. Furthermore, head 42 insures that the seal ring 21 is maintained in sealing engagement with the bore beneath the intersection of lower outer port 17 therewith, so that high pressure controlled fluid is prevented from commingling with low pressure control fluid in conduit 24 even though seal ring 40 may be lost and vent 41 clogged.

More particularly, in accordance with the preferred embodiment of the present invention, seat 43 on the valve body is conically shaped, and head 42 on the lower end of the spool has a conical shoulder 44 thereabout to form a metal-to-metal seal with the seat when engaged therewith. Thus, as previously described, even if all seal rings on the spool and on the piston are lost, and vent 41 is clogged, this metal-to-metal seal will normally contain the controlled pressure, and thus prevent it from venting or commingling with control pressure. Furthermore, even if the spool is not raised to engage shoulder 44 with seat 43, or if the metal-to-metal seal is imperfect, as long as seal ring 21 is effective, it will contain the controlled fluid, as previously described.

Still further, and as also previously described, load transmitting plate 30 is made of a material which will fuse in the event of fire, so that the spool would be free to move upwardly without the opposition of coil spring 26 since its outer diameter is less than the inner diameter of the coil spring. Thus, even if shoulder 44 is beneath seat 43, only a small amount of pressure would be required to move it up into seated position.

The high pressure valve, which is shown in FIG. 3 and indicated in its entirety by reference character 50, is in many respects identical to the low pressure valve 10, and consequently many of the reference characters shown in FIG. 3 are the same as those in FIGS. 1 and 2. For example, body 51 of valve 50 includes a main or central body portion 11A which is identical to body 11A of valve 11 including a longitudinal bore 12 therein and lateral ports 15, 16 and 17 connecting with the bore. Still further, a spool 18 identical to spool 18 of valve 10 is sealably reciprocable within the bore 12 between the lower position fluidly connecting ports 15 and 16 and blocking port 17, as shown in FIG. 3, and an upper position (not shown) fluidly connecting ports 16 and 17 and blocking port 15. The spool thus carries seal rings 19, 20 and 21 thereabout and has recesses 22 and 23, all in a manner identical to that of spool 18 of valve 10.

Furthermore, a conduit 25 connecting with the outer end of later port 16 leads to a motor valve operator or other device to be actuated. Conduit 24, on the other hand, leading from a source of control fluid is connected to the outer end of port 15, rather than to the outer end of port 17. Thus, in the lower position of the spool 18 shown in FIG. 3, control fluid is admitted through the port 15 into port 16 for admission through the motor valve operator, and when the spool is raised to its upper position, control fluid from the source is blocked off, while control fluid from the motor valve operator is vented through port 17.

Since this is a high pressure valve, the spool will remain in the lower position as long as the pressure of the controlled fluid is below predetermined level. However, when the controlled fluid rises above the predetermined high level, the spool is lifted to its upper position so as to vent the control fluid from the motor valve operator. As will be understood, and as shown and described in the aforementioned U.S. Pat. No. 3,043,331, high and low pressure valves of this type may be connected in series between the control pressure source and the motor valve operator so as to vent control fluid from the operator in the event the pressure of the control fluid is either too high or too low.

As will also be understood, spool 18 is urged to its lower position by the force of a coil spring arranged within a spring chamber on the upper end of the valve body, as shown in FIG. 1. On the other hand, the spool is urged to its upper position by means of a force due to the pressure of controlled fluid acting over a piston 39' having a seal ring 40' sealably reciprocable within a cylinder 35' formed in a chamber 14' provided by a lower valve body portion 11C'. As shown, valve body portion 11C' differs from valve body portion 11C of valve 10 in that its outer end is reduced to provide a cylinder 35' of considerably lesser cross-sectional area than cylinder 35 of valve 10 and a port 36' through its lower end is the same diameter as cylinder 35' to form a continuation thereof. On the other hand, its upper end is threaded for connection to the threaded lower end 34 of valve body portion 11A in the same manner as body portion 11C of the low pressure valve 10, and its lower end is similarly threaded at 37 for connection to conduit 38 leading from the flowline in which the controlled pressure is contained. A vent port 54 in body portion 11C' connects with cylinder 35' above seal ring 40' so as to function identically to vent port 41.

The upper end of piston 39' has a head 52 thereon having a lower conical shoulder 53 for seating on the lower conical wall of the upper end of chamber 14 at its intersection with cylinder 39' when the spool 18 is in its lowermost position. On the other hand, the spool 18 is located in its upper position in the same manner as spool of the low pressure pilot. That is, a conical shoulder 44 about a head 42 on the lower end of the spool moves into engagement with a conical seat 43 in the upper end of a chamber 14' at its intersection with the lower end of bore 12. Although not shown, a fusible plate would be engaged between the upper end of the spool and the coil spring, again for the purposes described in connection with valve 10.

Although piston 39' is shown to be smaller than piston 39 of valve 10, it obviously could be larger, depending on the desired function of valve 50. Also, the force characteristics of coil spring of valve 50 could be identical to, greater than, or less than that of coil spring 26 of valve 10, again depending on the function to be attained by the valve. Thus, the piston and coil spring provide variables which affect the pressures at which the valves will shift, while the port 15 or 17 to which conduit 24 is connected determines whether the valve responds to high or low pressure.

Thus, it will be understood that valve 50 functions to prevent blowout of the spool 18 and venting and commingling of controlled pressure in the same manner and under the same circumstances as valve 10.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a body having a bore extending longitudinally therein and lateral ports therein connecting with the bore at longitudinally spaced locations, a spool longitudinally reciprocable within the bore between first and second positions, said spool having means including longitudinally spaced seal rings thereabout sealably slidable within the bore for controlling the flow of a first fluid between said ports in each of said positions, said body having an enlarged chamber at each end of the bore, a spring arranged in one of the chambers, means including a retainer releasably connectible to said body at the end of said one chamber for compressing said spring to apply a force to one end of the spool for urging said spool to its first position, a piston which is disconnected from the spool and sealably reciprocable in a cylinder of said other chamber, said body having a port therein for admitting a second fluid to the other chamber on the outer side of the piston to urge said piston against said spool and thereby urge said spool to its second position, said body having a conical seat about the intersection of said other chamber with the adjacent end of said bore, and said spool having a head with a conical shoulder thereon for engaging said seat so as to limit movement of said spool beyond said second position and form a metal-to-metal seal therewith.

2. A valve of the character defined in claim 1, wherein there are three lateral ports in the body, and three seal rings carried by the spool, said intermediate seal ring being slidable across said intermediate port to sealably engage the bore on opposite sides thereof, and each of said other seal rings being sealably slidable with the bore between said one of said outer ports and the adjacent end of said bore for controlling the flow of a first fluid between the longitudinally intermediate port and one of the outer ports in each of said positions.

3. A valve of the character defined in claim 1, wherein said spring is a coil spring.

4. A valve of the character defined in claim 3, wherein the spool is disposed generally coaxially of and has an outer diameter less than the inner diameter of the coil spring, and siad means for urging said spool to its first position includes a plate for transmitting load between the spring and one end of the spool, said plate being of a material which fuses, in the event of a fire, to permit the spool to move to its second position.

5. A valve, comprising a body including a first portion having a bore extending longitudinally therein and lateral ports therein connecting with the bore at longitudinally spaced locations, a spool longitudinally reciprocable within the bore between first and second positions, said spool having means including longitudinally spaced seal rings thereabout sealably slidable within the bore for controlling the flow of a first fluid between said ports in each of said positions, means urging said spool to its first position, said body also including a second tubular portion threadedly connected to the first body portion to form a chamber at one end of said bore, a piston having a seal ring thereabout sealably slidable within the chamber and being longitudinally reciprocable between first and second limited positions within said chamber, a port in said second body portion for admitting a second fluid to the chamber on the outer side of the piston seal to urge said piston to its second position, one end of the spool engaging the inner side of the piston to move it to its first position as the spool moves to its first position, and the inner side of the piston engaging said one end of the spool to move it to its second position as the piston moves to its second position, and a vent port in said second body portion which connects with said chamber on the inner side of said piston seal, when the threads between the housing and first body portion are fully made up, but which connects therewith on the outer side of said piston seal as the threads are partially disconnected and the piston is in both its first and its second position.

6. A valve of the character defined in claim 5, wherein said first body portion has an outwardly facing seat thereon which surrounds the bore, and said spool is disconnected from the piston and has a head thereon for engaging the seat to limit movement of the spool beyond said second position.

7. A valve of the character defined in claim 6, wherein said seat is conical, and head on said spool has a conical shoulder thereabout to form a metal-to-metal seal with said seat.

8. A valve, comprising a body having a bore extending longitudinally therein and lateral ports therein connecting with the bore at longitudinally spaced locations, a spool longitudinally reciprocable within the bore between first and second positions, said spool having means including longitudinally spaced seal rings thereabout sealably slidable within the bore for controlling the flow of a first fluid between said ports in each of said positions, said body having an enlarged chamber at each end of the bore, a coil spring arranged in one of the chambers, a retainer releasably connectible to said body at the end of said one chamber for compressing said spring, a plate for transmitting load between the spring and one end of the spool for urging said spool to its first position, said spool being disposed generally coaxially of and having an outer diameter less than the inner diameter of the coil spring, and said plate being of a material which fuses, in the event of a fire, to permit the spool to move to its second position, means closing the other chamber, and means including a port for admitting a second fluid to the other chamber to apply a force to the other end of the spool to urge said spool to its second position, said body having a conical seat about the intersection of said other chamber with the adjacent end of said bore, said spool having a head with a conical shoulder thereon for engaging said seat so as to limit movement of said spool beyond said second position and form a metal-to-metal seal therewith.

9. A valve comprising a body having a bore extending longitudinally therein and three lateral ports connecting with the bore at longitudinally spaced locations, a spool longitudinally reciprocable within the bore between first and second positions, said spool having means including three seal rings thereabout sealably slidable within the bore, said intermediate seal ring being slidable across said intermediate port to sealably engage the bore on opposite sides thereof, and each of said outer seal rings being sealably slidable with the bore between said one of said outer ports and the adjacent end of said bore for controlling the flow of a first fluid between the longitudinally intermediate port and one of the outer ports in each of said positions, said body having an enlarged chamber at each end of the bore, a coil spring arranged in one of said chambers, means including a retainer releasably connectible to said body for compressing said spring to apply a force to one end of the spool for urging said spool to its first position, and a piston which is disconnected from the spool and longitudinally reciprocable within said other chamber, said body having a port therein for admitting a second fluid to said other chamber on the outer side of said piston to urge said piston against said spool and thereby urge said spool to its second position, said body having a seat thereon which surrounds the bore and faces away from the spring chamber, and said spool having a head thereon for engaging said seat so as to limit movement of said spool beyond said second position, said seat being conical and located at the intersection of said other chamber with the adjacent end of said bore, the head on said spool having a conical shoulder thereabout to form a metal-to-metal seal with said seat, said spool being disposed generally coaxially of and having an outer diameter less than the inner diameter of the coil spring, said means for urging said spool to its first position including a plate for transmitting load between the spring and one end of the spool, and said plate being of a material which fuses, in the event of a fire, to permit the spool to move to its second position.

* * * * *